(No Model.) 2 Sheets—Sheet 2.
S. E. NUTTING.
MECHANICAL MOVEMENT.
No. 454,658. Patented June 23, 1891.
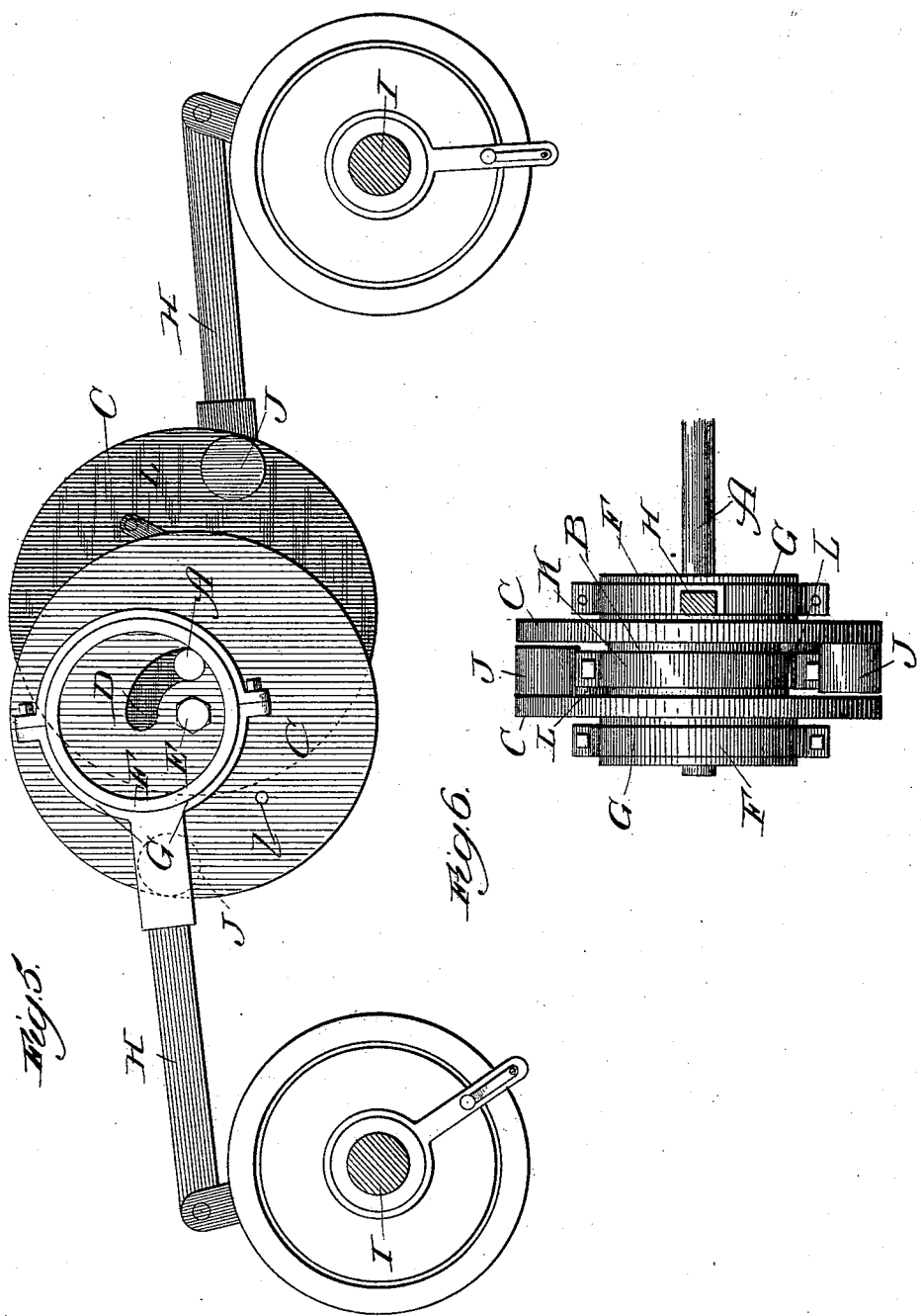

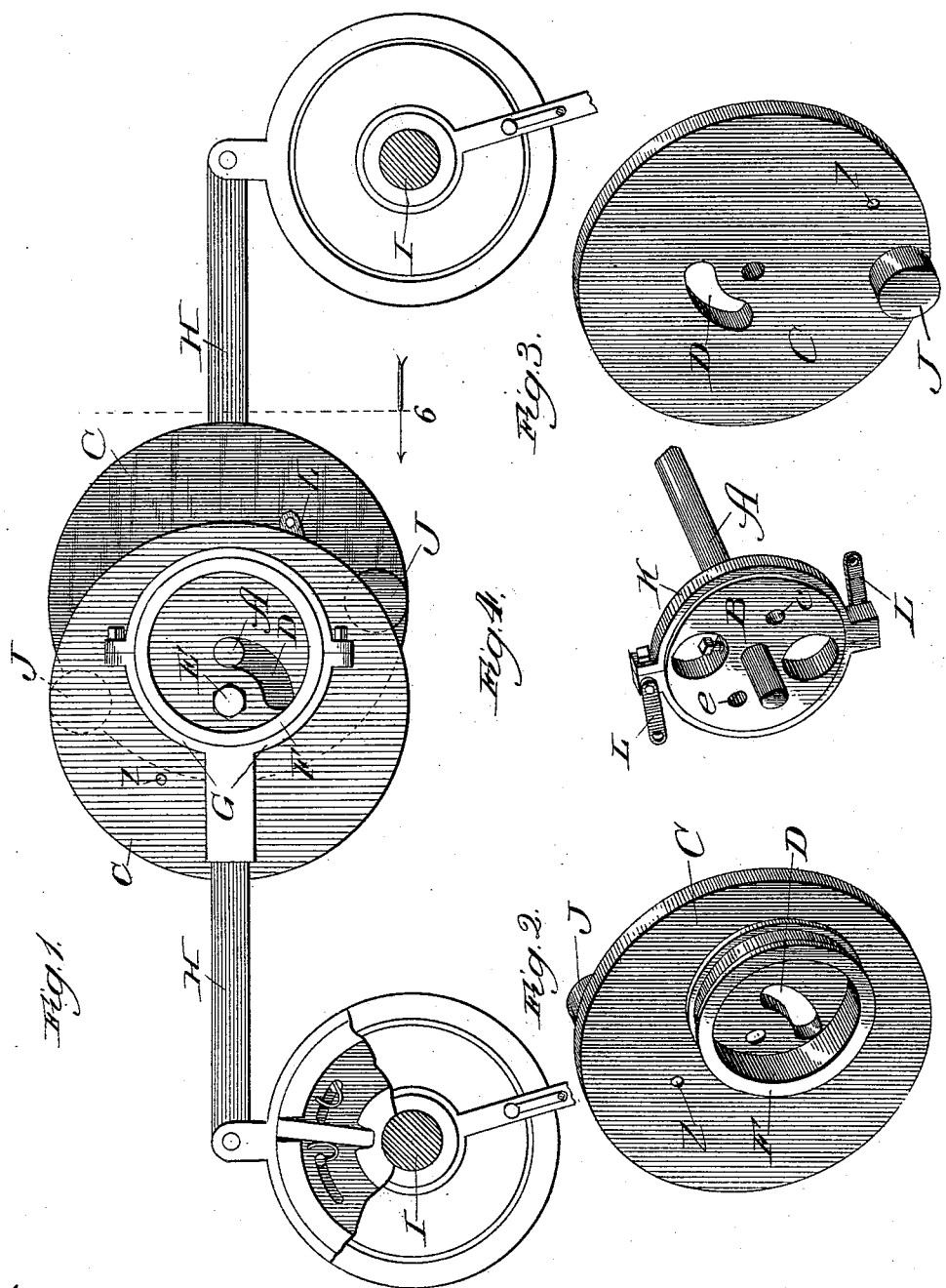

UNITED STATES PATENT OFFICE.

SAMUEL E. NUTTING, OF CHICAGO, ILLINOIS, ASSIGNOR TO THE NUTTING ELECTRIC MANUFACTURING COMPANY, OF SAME PLACE.

MECHANICAL MOVEMENT.

SPECIFICATION forming part of Letters Patent No. 454,658, dated June 23, 1891.

Application filed August 7, 1890. Serial No. 361,343. (No model.)

*To all whom it may concern:*

Be it known that I, SAMUEL E. NUTTING, a citizen of the United States, residing at Chicago, Illinois, have invented certain new and useful Improvements in Mechanical Movements, of which the following is a specification.

The object of my invention is to make a machine in which the relative speed of the driving-shaft and the driven shaft may be automatically varied according to the work which the driven shaft is required to perform without being obliged to vary the speed of the driving-shaft; and my invention consists in the features and details of construction hereinafter described and claimed.

In the drawings, Figure 1 is a side elevation showing the arrangement of the parts mounted on the driving-shaft and on the driven shaft. Fig. 2 is a perspective view of one of the disks disconnected from the other parts. Fig. 3 is a perspective view of the same disk, viewed from the other side. Fig. 4 is a perspective view of the driving-shaft and the hub mounted and fixed thereon, which is arranged intermediate the disks with a loose collar around the hub and connecting parts. Fig. 5 is a side elevation of the parts shown in Fig. 1 in another position, and Fig. 6 is an end elevation taken in the line 6 of Fig. 1.

In making a machine in which I can operate the driving-shaft at any desired or given speed, and automatically vary the speed of the shaft or shafts driven by it according to the work which they are to perform, I arrange a shaft A in suitable journals or bearings and adapted to be driven or rotated by any convenient motive power—as steam, hand, electric, or other power. In use, however, I contemplate more particularly the employment of an electric motor for imparting rotation to the shaft A. At any convenient point on this shaft I arrange a hub B, which is fixed to the shaft by a set-bolt or otherwise so as to rotate with it. On one or both sides of this hub, as it may be desirable to drive one or more shafts, I arrange a disk or disks C. For convenience, however, I will describe the construction, arrangement, and operation of the parts where two disks are employed for imparting rotary motion to shafts. These disks are mounted eccentrically on shaft A through means of slots D at one side of their centers. They are, however, centrally connected with the hub B by means of pins E, extending out from the hub at one side of its center, as from the holes *e* into holes in the centers of the disk. On one side of each of the disks is arranged an eccentric F, preferably grooved and cast or made integral with the disk and having its center, when in a state of rest, corresponding with the center of the shaft A. Around this grooved eccentric is arranged a collar G, carrying a pitman or reciprocating bar H. This pitman is connected with a device on the shafts I which are to be driven, adapted to convert a reciprocating motion into a rotary motion. I have shown in Fig. 1 such a device; but as I have made it the subject of another application for a patent bearing even date with this one, and numbered 361,344, I need not describe it in detail. Any other device adapted to convert reciprocating motion into rotary motion may be employed, however, if preferred. At one side of each of the disks is arranged a weight J. Before the addition of these weights it will be understood that the disks with their eccentrics are balanced on the pins or studs E, connecting their centers eccentrically with the hub. The addition of these weights serves to make the disks heavier at the particular point where they are placed than at any other point. The slots D in the disks may be of any desired size or shape, as they are simply intended to afford space to permit the disks to move or change their position relatively to the hub. In other words, the slots permit the disks to partially rotate on the pins E, which they could not do if they were held at two places by the pin and the shaft A. The extent of their rotation may be governed by the size or length of the slot. As the shaft A rotates and with it rotates the hub B, the disks C will be carried around by the pins E. This would cause the eccentric F also to be carried around with the shaft A as its center of rotation. In this case, however, the collar G would simply slide around the eccentric without imparting any motion to the bars H. As, however, the disks are provided with weights J, the action of the centrifugal force produced by the carrying around of the disks by the pin E tends to cause such weights, or, in other words, the heaviest portion of the disks, to be moved or thrown to the farthest position possible from the center of rotation, which, as above explained, is the shaft A. This movement of the weighted portion of the disks under the action of centrifugal force partially turns or rotates the disks on the pins E. As the weighted portions of the disks thus move under the action of centrifugal force, the eccentric F, arranged on them, is also moved so that it ceases to have the shaft A for its center. The degree of eccentricity which it assumes to such shaft depends upon and is proportioned to the extent to which the weights cause the disks to be turned or moved on the pins E as soon as the disks and the eccentric are moved by the weights, so that the shaft A ceases to be the center of the eccentric and reciprocating motion is imparted to the bars H. As the eccentric is moved farther away from its original center—the shaft A—the greater becomes the reciprocating motion of the bars H. In other words, the greater the degree of eccentricity which the eccentric assumes to the shaft A the greater will become the reciprocating motion of the bars H; and, as above explained, the degree of eccentricity which exists at any time between the eccentric and the shaft depends upon the extent to which the centrifugal force can move or partially rotate the disks on the pin E. Where the work to be performed by the rotation of the shafts I is small, the more easily will such shafts be rotated and the less will the power exerted in their rotation operate against or counteract the operation of the centrifugal force tending to move the disks on the pins E. As the work to be performed increases, however, so that more power is necessary to rotate the shafts I, the greater force or resistance there will be opposed to the operation of the centrifugal force. When the centrifugal force is only able to move the weighted portions of the disks a small distance, and thus produce but a small degree of eccentricity between the eccentric F and the shaft A, but a short reciprocating movement will be imparted to the bars H. The length of movement or stroke in these bars increases or diminishes according as a greater or less amount of eccentricity in the eccentric is produced and maintained by the centrifugal force, and the extent that a given amount of centrifugal force will be able to move the disks and produce this eccentricity in the eccentric constantly depends upon the amount of resistance which the operation of the shafts I opposes to its action. Hence, although the shaft A may be constantly rotated at a uniform speed, and thus develop a uniform amount of centrifugal force, such force will only be able to move the weights on the disks a distance from the center of rotation and produce a degree of eccentricity between the eccentric and the shaft proportioned to the amount of resistance necessary to be overcome in the rotation of the driven shafts I. In other words, in proportion to the amount of work to be performed. If the shaft A is constantly rotating at uniform speed and producing uniform amount of centrifugal force, the extent of movement of the reciprocating bars will be long or short according to the work to be done, and therefore the rotation of the shafts I will be slow or rapid according to the amount of such work. I wish to say, however, that I of course understand that by varying the speed of rotation of the driving-shaft I can increase or decrease the amount of centrifugal force developed, the degree of eccentricity between the eccentric and the shaft, the extent of movement of the reciprocating bars and the speed of rotation of the driven shafts, as well as by varying the load or work to be done.

In order to connect the disks and cause them to move together, I have provided the hub with a loose collar K, with links L, which are pivoted, respectively, to the holes *l* in the disks.

Although I have shown the disks C as circular in form, yet I have employed this form simply as a matter of convenience for balancing the parts and not from necessity, as the weights might be hung on projecting arms connected with the eccentric, so as to be held in proper position, and other means employed for properly balancing the parts on the pin E. If, therefore, I use the term "disks" in my specification and claims, I desire it to be understood that I use such term merely as a convenient way of designating some device or means enabling the weights to be arranged at proper positions at the side of the center of rotation and balancing the parts on the pins E. It is also merely as a matter of convenience that I have termed the connection between the shaft A and the eccentric F as a "hub." Any device or means that will serve to form a connection so as to impart rotation from the shaft to the eccentric will serve the purpose, and in using the word "hub" in the specification and claims I wish it to be understood in this broad sense.

I may say in conclusion that, stripped of its non-essentials, my invention consists in the employment of a shaft that may be rotated by any convenient motive power, an eccentric which is rotated by the shaft and which in a state of rest has its center approximately corresponding to the center of the shaft or center of rotation, and which is movable by the action of centrifugal force into a position eccentric to the shaft, the degree of eccentricity produced by the centrifugal force being proportionate to the difficulty of operating the parts dependent upon the eccentric for their motion, and in connecting with the eccentric a bar for imparting movement to the parts which are intended to be operated or which are intended to do the work desired.

What I regard as new, and desire to secure by Letters Patent, is—

1. In a machine for producing mechanical movement, the combination of a revoluble shaft, an eccentric revoluble by the shaft and in a state of rest having its center corresponding approximately to the center of the shaft and movable by the action of centrifugal force into position eccentric to the shaft, a revoluble shaft provided with a device for converting reciprocating into rotary motion, and a bar connected to the eccentric and to such device for imparting motion to its shaft, substantially as described.

2. In a machine for producing mechanical movement, the combination of a revoluble shaft, an eccentric revoluble by the shaft and in a state of rest having its center approximately corresponding to the center of the shaft, a weight at one side of the center of rotation, said eccentric movable by the action of centrifugal force into a position eccentric to the shaft, and a bar connected to the eccentric for imparting movement to other parts, substantially as described.

3. In a machine for producing mechanical movement, the combination of a revoluble shaft, a hub revoluble with the shaft, an eccentric having its center in a state of rest approximately corresponding to the center of the shaft and pivoted to the hub at a point eccentric to the shaft and movable on its pivotal point by the action of centrifugal force to a position eccentric to the shaft, and a bar connected to the eccentric for imparting movement to other parts, substantially as described.

SAMUEL E. NUTTING.

Witnesses:
THOMAS A. BANNING,
JAMES W. HEDENBERG.